(12) United States Patent
Kousaka et al.

(10) Patent No.: US 8,142,875 B2
(45) Date of Patent: Mar. 27, 2012

(54) EPOXY RESIN COMPOSITION FOR FIBER-REINFORCED COMPOSITE MATERIAL

(75) Inventors: Takashi Kousaka, Hiratsuka (JP);
Mitsuhiro Iwata, Hiratsuka (JP);
Tomohiro Ito, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 245 days.

(21) Appl. No.: 12/298,053

(22) PCT Filed: Apr. 24, 2007

(86) PCT No.: PCT/JP2007/058869
§ 371 (c)(1),
(2), (4) Date: Oct. 22, 2008

(87) PCT Pub. No.: WO2007/125925
PCT Pub. Date: Nov. 8, 2007

(65) Prior Publication Data
US 2009/0068395 A1 Mar. 12, 2009

(30) Foreign Application Priority Data
Apr. 25, 2006 (JP) .................... 2006-120696

(51) Int. Cl.
*B32B 3/12* (2006.01)

(52) U.S. Cl. ............ 428/117; 428/320.2; 428/368; 428/372; 428/394; 428/396; 428/408; 428/539.5; 524/105; 524/167; 524/170; 524/284; 524/266; 524/538; 524/612; 525/403; 525/409; 525/430; 525/436; 525/535

(58) Field of Classification Search ............ 525/403, 525/409, 430, 436, 535; 428/117, 320.2, 428/368, 372, 394, 396, 408, 539.5; 524/105, 524/167, 170, 284, 366, 538, 612
See application file for complete search history.

(56) References Cited

U.S. PATENT DOCUMENTS

| | | | |
|---|---|---|---|
| 5,413,847 A * | 5/1995 | Kishi et al. | 442/69 |
| 6,596,373 B1 * | 7/2003 | Kishi et al. | 428/116 |
| 6,838,176 B2 * | 1/2005 | Goto et al. | 428/413 |

FOREIGN PATENT DOCUMENTS

| | | |
|---|---|---|
| JP | 62-185720 | 8/1987 |
| JP | 63-221139 | 9/1988 |
| JP | 2004-277481 | 10/2004 |
| JP | 2005-298713 | 10/2005 |

OTHER PUBLICATIONS

Hibino, K.; Kimura, Y.; Colloid Polymer Science, 2000, p. 565-570.*

* cited by examiner

*Primary Examiner* — David W Wu
*Assistant Examiner* — Robert Jones, Jr.
(74) *Attorney, Agent, or Firm* — Connolly Bove Lodge & Hutz LLP

(57) ABSTRACT

Provided is an epoxy resin composition for fiber-reinforced composite materials, which serves as a matrix resin composition for use in a self-adhesive prepreg for a face sheet of a honeycomb panel. The epoxy resin composition enables to increase self-adhesiveness of the prepreg, while improving workability and appearance quality of the prepreg. The epoxy resin composition is characterized by containing: an epoxy resin (A) which is in a liquid state at room temperature; a thermoplastic resin (B) which dissolves in the epoxy resin (A) at a temperature not less than 90° C.; thermosetting resin particles (C) which do not completely dissolve in the epoxy resin (A) at a temperature less than 90° C. and has a softening point of not less than 120° C.; and a curing agent (D).

16 Claims, No Drawings

US 8,142,875 B2

EPOXY RESIN COMPOSITION FOR FIBER-REINFORCED COMPOSITE MATERIAL

CROSS REFERENCE TO RELATED APPLICATIONS

This application is a national phase of PCT/JP2007/058869, filed Apr. 24, 2007, which claims priority to JP 2006-120696, filed on Apr. 25, 2006, the entire contents of which are in corporated herein by reference in their entireties.

TECHNICAL FIELD

The present invention relates to an epoxy resin composition for fiber-reinforced composite materials, and more specifically, relates to an epoxy resin composition for use in a self-adhesive prepreg for a face sheet of a honeycomb panel.

BACKGROUND ART

Fiber-reinforced composite materials containing an epoxy resin composition serving as a matrix resin have been widely used for aircrafts, automobiles, and industrial applications due to their superior mechanical properties and the like. Especially, as for structural and interior materials for aircrafts, from the perspective of achieving lighter weight, there are more cases where fiber-reinforced composite materials are used as face sheets of honeycomb panels.

Conventionally, a honeycomb panel is produced in so-called co-cure molding in which a film-type adhesive agent is placed on both sides of a honeycomb core, a prepreg (uncured fiber-reinforced composite resin material) serving as a face sheet is laminated on the both sides of the honeycomb core, and curing of a resin constituting the prepreg and adhesion between the face sheet and the honeycomb core are performed simultaneously. However, in order to obtain a lighter honeycomb panel and to reduce cost for molding, a so-called self-adhesion technique for directly bonding a honeycomb core and a prepreg has been demanded. However, since self-adhesiveness of a prepreg is associated with viscosity and toughness of resin, depending on how they are adjusted, porosity (uneven part on the surface) in the prepreg laminated on a honeycomb core may be caused, or tackiness and drapability of the prepreg may be impaired, resulting in lowering productivity. Therefore, it has been an extremely difficult task to increase the self-adhesiveness.

For improving self-adhesiveness of a prepreg, it is important to form a fillet by wetting a bonding surface between a honeycomb core and the prepreg with a prepreg resin during thermal curing, so-called fillet forming, and to obtain a favorable shape and strength of the fillet. The fillet is formed by the resin in a state or hanging or climbing from the prepreg in a thickness direction of the honeycomb core along a wall of the honeycomb. The shape of the fillet is deeply associated with the viscosity of the resin. If the degree of the hanging or climbing is too large, porosity is more likely to be formed, resulting in an uneven part on the surface. It the viscosity is too high, tackiness (adhesiveness) and drapability (flexibility) are impaired. In addition, the strength of the fillet is affected by the toughness of a resin constituting the prepreg.

Patent Document 1 proposes a self-adhesive prepreg having a matrix resin composition including a thermosetting resin, a viscosity control agent made of a thermoplastic resin which dissolves in the thermosetting resin, thermoplastic resin particles which are not dissolved in the thermosetting resin, and a curing agent. Likewise, Patent Document 2 proposes a woven fabric prepreg having a matrix resin composition including thermoplastic resin particles and a thermosetting resin composite containing a thermoplastic resin. However, in these self-adhesive prepregs, although the viscosity characteristics of a resin composition is improved and the shape of fillet is modified, there are a problem that tackiness and drapability, which are important characteristics of workability in prepreg handling, are poor, and a problem that the prepregs are inferior in porosity. Therefore, the proposed self-adhesive prepregs above have a problem that the workability and appearance quality thereof are not at a sufficient level although the adhesiveness thereof has been improved to some extent.

Patent Document 1: Japanese Patent Translation Publication No. 2005-506394
Patent Document 2: Japanese Patent No. 3661194

DISCLOSURE OF THE INVENTION

Problems to be Solved by the Invention

An object of the present invention is to provide an epoxy resin composition for fiber-reinforced composite materials, which serves as a matrix resin composition for use in a self-adhesive prepreg for a face sheet of a honeycomb panel. The epoxy resin composition enables to increase self-adhesiveness of the prepreg, while improving workability and appearance quality of the prepreg.

Means for Solving the Problems

The epoxy resin composition of the present invention for fiber-reinforced composite materials which achieves the above object is characterized by containing: an epoxy resin (A) which is in a liquid state at room temperature; a thermoplastic resin (B) which dissolves in the epoxy resin (A) at a temperature not less than 90° C.; thermosetting resin particles (C) which do not completely dissolve in the epoxy resin (A) at a temperature less than 90° C. and has a softening point of not less than 120° C.; and a curing agent (D).

EFFECTS OF THE INVENTION

The epoxy resin composition of the present invention for fiber-reinforced composite materials is mainly composed of the epoxy resin (A) which is in a liquid state at room temperature and the thermoplastic resin (B) which dissolves in the epoxy resin (A) at a temperature not less than 90° C. Accordingly, the thermoplastic resin (B) dissolves in the epoxy resin (A) easily and uniformly. Therefore, impregnation properties thereof to a reinforcing fiber for a prepreg can be improved. Furthermore, the thermosetting resin particles (C) which do not completely dissolve in the epoxy resin (A) at a temperature less than 90° C. and has a softening point of not less than 120° C. are added to these main components. Accordingly, the thermosetting resin particles (C) are not dissolved in the epoxy resin (A) before the resin temperature becomes high in a heat curing process. Therefore, in a heat curing process in which a prepreg is laminated on a honeycomb core and heated for curing, it is possible to adjust viscosity behavior associated with temperature rising of the resin composition, and thereby to prevent an increase of surface porosity caused by an excessive amount of the resin composition flowing to a fillet. Furthermore, before the heat curing process, excellent workability can be acquired by improving tackiness and drapability.

BEST MODES FOR CARRYING OUT THE INVENTION

The epoxy resin composition of the present invention for fiber-reinforced composite materials is mainly composed of the epoxy resin (A) which is in a liquid state at room temperature and the thermoplastic resin (B) which dissolves in the epoxy resin (A) at a temperature not less than 90° C. The epoxy resin (A) is in a liquid state at room temperature. When the epoxy resin (A) is in a semisolid or solid state at room temperature, it is difficult to thoroughly dissolve the thermoplastic resin (B). As for the properties of the epoxy resin (A), a viscosity at 25° C. is preferably from 1 to 100 poises, and more preferably from 5 to 50 poises. Viscosity at 25° C. is a value measured using a BH-type rotary viscometer. To be more specific, a can containing an epoxy resin is placed in a thermostatic bath kept at a temperature of 25° C., and the value is read from the scale of the BH-type rotary viscometer when the load thereof is stabilized.

As for the epoxy resin (A), although not particularly limited as long as it is in a liquid state at room temperature, epoxy resins having between 2 to 4 functional groups are preferred. Examples of such resins include: bisphenol A-type epoxy resins; bisphenol F-type epoxy resins; naphthalene-type epoxy resins; diphenylfluorene-type epoxy resins; triglycidyl aminophenol resins; triglycidyl aminocresol resins; tetraglycidyl diaminodiphenylmethane resins; tetraglycidyl m-xylylene amine resins; N,N-diaminocresol resins; phenol novolac-type epoxy resins; and various modified epoxy resins derived from these resins. From these resins, a low molecular weight-type epoxy resin may be selected accordingly. As the epoxy resin (A), according to demand characteristics of a prepreg, one resin alone or more than two kinds of resin in combination selected from the above-listed epoxy resins may be used.

An epoxy resin which is in a semisolid or solid state at room temperature may be used in combination with the epoxy resins (A) which is in a liquid state at room temperature within a range not impairing the effects of the present invention. In such a case, an epoxy resin which is in a solid state at room temperature is preferably set to 20 parts by weight or less with respect to 100 parts by weight of the epoxy resin (A) which is in a liquid state at room temperature.

The epoxy resin composition of the present invention contains the thermoplastic resin (B), which dissolves in the epoxy resin (A) at a temperature not less than 90° C., in a dissolved state. The thermoplastic resin (B) dissolves in the epoxy resin (A) at a temperature not less than 90° C., preferably at a temperature of from 95° C. to 150° C. By having such properties, the thermoplastic resin (B) can be uniformly dissolved in the epoxy resin (A). By dissolving the thermoplastic resin (B) in the epoxy resin (A) the viscosity of the epoxy resin composition constituting a prepreg can be adjusted easily, and thereby a good fillet can be formed easily.

Although kinds of the thermoplastic resin (B) are not particularly limited, they are preferably at least one kind selected from the group consisting of: polyethersulfone resins; polyetherimide resins; polyimide resins; polyamide resins; polyether resins; polyester resins; polysulfone resins; polyamide-imide resins; polyacrylate resins; polyarylether resins; polyphenylether resins; and polyetheretherketone resins. The thermoplastic resin (B) is particularly preferred to be polyethersulfone resins and/or polyetherimide resins. These resins have higher compatibility or affinity with an epoxy resin component compared to other thermoplastic resins; therefore, toughness of a cured resin product can be improved.

It is preferred to add the thermoplastic resin (B) in a particle state, and more preferred to use those having a particle diameter of 200 μm or less, further preferred from 5 to 100 μm. By using fine particles of thermoplastic resin having such a particle diameter, when add to the epoxy resins, the particles are dissolved rapidly and uniformly while avoiding having large particles left undissolved. Therefore, viscosity characteristics and toughness of the resin composition can be improved. In other words, by using fine particles having a particle diameter of 200 μm or less as the thermoplastic resin (B), the thermoplastic resin (B) is dissolved in the epoxy resin (A) uniformly; thus, physical properties, especially toughness, of the resin composition can be improved. A method for preparing fine particles having a particle diameter of 200 μm or less is not particularly limited; however, fine particles are preferably prepared by an impact grinding method or a spray drying method.

The epoxy resin composition of the present invention contains thermosetting resin particles (C). The thermosetting resin particles (C) do not completely dissolve in the epoxy resin (A) at a temperature of less than 90° C., preferably from 60° C. to 90° C., and has a softening point of not less than 120° C., preferably from 130° C. to 160° C. The softening point is a value measured according to JIS K-7234.

The thermosetting resin particles (C) do not completely dissolve in the epoxy resin (A) before the resin temperature becomes high in a heat curing process, and dissolve uniformly when a predetermined temperature is reached. Accordingly, while adjusting the viscosity of the epoxy resin composition, and thereby preventing a deterioration of surface porosity caused by an excessive amount of the resin composition constituting the prepreg flowing to a fillet, a good fillet can be formed. In the meantime, by adding the thermosetting resin particles (C), the amount of the thermoplastic resin (B) to be added can be reduced. Therefore, before the heat curing process, tackiness and drapability of the prepreg can be improved, and thereby excellent workability can be achieved. Furthermore, in the case where the thermosetting resin particles (C) are added, the effect of improving toughness of the epoxy resin composition is superior compared to the case where the thermoplastic resin particles which are not to be dissolved are added. Therefore, the fillet strength is improved, the adhesion strength with the honeycomb core is further enhanced, and thereby the self-adhesiveness can be improved.

In the present invention, kinds of the thermosetting resin particles (C) are not particularly limited. However, examples are: maleimide-based resins; cyanate-based resins; unsaturated polyester resins; vinylester resins; phenol resins; and epoxy-type resins. Preferred are epoxy-type resins, maleimide-based resins, and cyanate-based resins, which are in a solid state at room temperature, especially preferred are bisphenol A-type epoxy resins which are in a solid state at room temperature. The bisphenol A-type epoxy resins which are in a solid state at room temperature can be each prepared by purifying a bisphenol A-type epoxy resin for increasing the purity while increasing the molecular weight. Such bisphenol A-type epoxy resins are preferred because of the effects of improving a prepreg in workability and porosity with its high softening point.

The particle diameter of the thermosetting resin particles (C) is preferably 100 μm or less, and more preferably from 5 to 50 μm. By setting the particle diameter of the thermosetting resin particles (C) in such a range, they dissolve uniformly when a predetermined temperature is reached in the heat curing process. Accordingly, the viscosity of the epoxy resin composition can be properly adjusted.

The epoxy resin composition of the present invention contains the curing agent (D). Kinds of the curing agent (D) are not particularly limited as long as a compound has an active group which can react with an epoxy group. However, preferred examples are: aromatic polyamines; aliphatic polyamines; imidazole compounds; tetramethylguanidine; thiourea-added amines; carboxylic acid anhydrides; carboxylic acid hydrazides; carboxylic acid amides; polyphenol compounds; novolac resins; and polymercaptans. Especially, in the perspective of improving toughness of a cured resin product, it is preferred to use aromatic polyamines, such as diaminodiphenylmethanes and diaminodiphenylsulfones. In particular, it is especially preferred to use 3,3'-diaminodiphenylsulfone (3,3'-DDS) and/or 4,4'-diaminodiphenylsulfone (4,4'-DDS).

Furthermore, the curing agent (D) is preferably used with a latent curing agent. The latent curing agent is preferably at least one selected from the group consisting of: organic acid dihydrazides; dicyandiamides; aminimides; tertiary amine salts; imidazole salts; Lewis acids; and Brönsted acids, and especially preferred are organic acid dihydrazides and dicyandiamides. By using a latent curing agent in combination, toughness of a cured resin product can be improved, and thereby self-adhesiveness of a prepreg can be increased.

The epoxy resin composition of the present invention may contain, with respect to 100 parts by weight of the epoxy resin (A), the thermoplastic resin (B) in an amount of preferably 20 to 60 parts by weight, more preferably 30 to 50 parts by weight, and the thermosetting resin particles (C) in an amount of preferably 2 to 20 parts by weight, more preferably 5 to 15 parts by weight.

When the thermoplastic resin (B) is added in an amount in a range from 20 to 60 parts by weight, the viscosity of the epoxy resin composition can be properly adjusted, and thereby tackiness and drapability can be improved. When the thermosetting resin particles (C) is added in an amount in a range from 2 to 20 parts by weight, the viscosity of the epoxy resin composition can be properly adjusted. When added in an amount of 2 parts by weight or more, toughness of a cured product can be improved. When added in an amount of 20 parts by weight or less, it is possible to improve tackiness and drapability by achieving an appropriate hardness of the prepreg.

The curing agent (D) may be preferably added in an amount of 25 to 50 parts by weight, more preferably 30 to 45 parts by weight, with respect to 100 parts by weight of the epoxy resin (A). By setting an amount of the curing agent (D) added in an amount of 25 to 50 parts by weight, physical properties, such as strength, toughness, and thermal resistance, required for a cured resin product serving as a face sheet can be sufficiently achieved.

In the epoxy resin composition of the present invention for fiber-reinforced composite materials, the above components (A) to (D) are essential. However, within a range not impairing the effects of the present invention, various additive agents, such as publicly-known curing agents, fillers, stabilizers, flame retardants, and pigments, other than the above components (A) to (D), may be added as needed.

In the epoxy resin composition of the present invention, a minimum viscosity, which is measured in dynamic viscoelasticity measurement at a temperature rise rate of 2° C./minute, is preferably from 10 to 150 Pa·s, and more preferably from 20 to 100 Pa·s. Setting a minimum viscosity in dynamic viscoelasticity measurement in the above range is effective for expressing productivity and self-adhesiveness of the prepreg. Accordingly, while increasing self-adhesiveness by forming a good fillet, the productivity of impregnating a reinforcing fiber with the resin composition in prepreg production can be improved. It should be noted that, in the present invention, a minimum viscosity in dynamic viscoelasticity measurement refers to a minimum value of complex viscosity measured on an epoxy resin composition as a sample in dynamic viscoelasticity measurement at a temperature in a range from 25° C. to 200° C. at a temperature rise rate of 2° C./minute at a frequency of 10 rad/second at a strain of 1%.

As for the epoxy resin composition of the present invention, the cured product thereof obtained after curing has a fracture toughness value, which is measured according to ASTM D5045-91, of preferably 1.8 MPa·$\sqrt{m}$ or larger, more preferably from 1.8 to 2.5 MPa·$\sqrt{m}$. When the fracture toughness value of the cured product of the epoxy resin composition is 1.8 MPa·$\sqrt{m}$ or larger, toughness of a fillet part is high, and the peeling strength can be so improved that material fracture starts to occur in a part of a honeycomb core in a peeling test after bonding of a face sheet (prepreg) and the honeycomb core.

A method for producing the epoxy resin composition of the present invention for fiber-reinforced composite materials is not particularly limited. However, in a preferred method, the thermoplastic resin (B) is dissolved preferably at a temperature of from 95 to 150° C., more preferably at a temperature of from 100 to 125° C., in the epoxy resin (A), this mixed solution is cooled to a temperature preferably from 60 to 90° C., more preferably from 70 to 80° C., and then the thermosetting resin particles (C) and the curing agent (D) are added to the mixed solution. To be more specific, the epoxy resin (A) and the thermoplastic resin (B) may be stirred and mixed by using a planetary mixer set at a temperature of from 95 to 150° C. for approximately 0.5 to 3 hours until being uniformly dissolved. Thereafter, this mixed solution is cooled to a temperature of from 60 to 90° C., and then the thermosetting resin particles (C) and the curing agent (D) are added to the mixed solution, and uniformly dispersed and mixed to preferably prepare the epoxy resin composition. In such a production method, the thermoplastic resin (B) can be thoroughly dissolved, while the thermosetting resin particles (C) are dispersed uniformly. Hence, it is possible to increase the self-adhesiveness of the prepreg while improving workability and appearance quality of the prepreg.

The fiber-reinforced prepreg of the present invention includes the above-described epoxy resin composition for fiber-reinforced composite materials as a matrix resin in complex with a reinforcing fiber. Preferred examples of the reinforcing fiber include carbon fibers, graphite fibers, aramid fibers, and glass fibers. Among these, carbon fibers and a carbon fibers fabric made thereof are especially preferred.

In the fiber-reinforced prepreg, the content of matrix resin may be preferably set to from 30 to 50 weight %, and more preferably set to from 35 to 45 weight %. When the proportion of matrix resin in the fiber-reinforced prepreg is in this range, it is possible to increase self-adhesiveness of the prepreg while improving workability and appearance quality thereof, and further to fully maximize mechanical properties of the carbon fiber-reinforced composite material.

As for a method for producing the fiber-reinforced prepreg, a hot-melt method is preferred in which a so-called resin film prepared by coating an exfoliate paper with the epoxy resin composition of the present invention in a thin film form is arranged above and below reinforcing fiber, and the reinforcing fiber is impregnated with the epoxy resin composition by application of heat and pressure. Using a specific epoxy resin composition, the prepreg thus obtained is superior in tackiness and drapability, and improves workability of the prepreg. Thus, production efficiency of the prepreg can be improved.

By laminating the fiber-reinforced prepreg thus obtained on both sides of a honeycomb core and performing thereon heat curing molding, such as regular autoclave molding and hot-press molding, a fiber-reinforced composite material can be produced. The fiber-reinforced composite material thus obtained not only has a good fillet formed thereon and is superior in honeycomb core adhesiveness of the prepreg, but also is excellent in smoothness on the prepreg surface and has excellent appearance and surface characteristics with less porosity (uneven part on the surface).

A honeycomb core used in the present invention may be preferably anyone of aramid honeycombs, aluminum honeycombs, paper honeycombs, and glass honeycombs. Among these, aramid honeycombs are preferred.

In the following section, the present invention will be further described by referring to Examples. However, the scope of the invention is not to be limited by these Examples.

EXAMPLES

Examples 1 to 3 and Comparative Examples 1 to 4

Epoxy resin compositions were prepared by mixing the epoxy resin (A), which is in a liquid state at room temperature, the thermoplastic resin (B), the thermosetting resin particles (C), and the curing agent (D) selected from those listed below at mixing proportions respectively described in Examples 1 to 3 and Comparative example 1 to 4 in Table 1. Characteristics of the epoxy resin compositions were evaluated. First, an entire amount of the epoxy resin (A) and a part of the thermoplastic resin (B) to be dissolved were stirred and mixed using a planetary mixer set to a temperature of 125° C. for 75 minutes until a uniform solution was obtained. Thereafter, the temperature of the planetary mixer was set to 70° C. When the resin temperature became uniform, entire amounts of the thermosetting resin particles (C) and the curing agent (D), and, in the case of Comparative Example 2, an undissolved part of the thermoplastic resin (B), were added to the solution, and stirred and mixed to prepare an epoxy resin composition.

Epoxy resins (A) which is in a liquid state at room temperature

Resin A-1: N,N,O-triglycidyl-p-aminophenol resin (MY-0510 manufactured by Huntsman Advanced Materials LLC), in a liquid state at room temperature, the viscosity at a temperature of 25° C. is 7 poises.

Resin A-2: triglycidyl alkyl aminophenol resin (ELM-100 manufactured by Sumitomo Chemical Co., Ltd.), in a liquid state at room temperature, the viscosity at a temperature of 25° C. is 10 poises.

Resin A-3: bisphenol F-type epoxy resin (YDF-170 manufactured by Tohto Kasei Co., Ltd.), in a liquid state at room temperature, the viscosity at a temperature of 25° C. is 35 poises.

Resin A-4: phenol novolac-type epoxy resin (N-775 manufactured by Dainippon Ink & Chemicals, Inc.), in a solid state at room temperature, the viscosity at a temperature of 25° C. cannot be measured.

Thermoplastic Resins (B)

Resin B-1: polyethersulfone resin (Sumikaexcel PES5003P manufactured by Sumitomo Chemical Co., Ltd.), prepared as fine particles having a particle diameter of 100 μm or less by impact grinding.

Thermosetting Resin Particles (C)

Particle C-1: bisphenol A-type epoxy resin (YD-020N manufactured by Tohto Kasei Co., Ltd.), a softening point is from 135° C. to 150° C., prepared as fine particles having a particle diameter of 100 μm or less by impact grinding.

Particle C-2: dicyclopentadiene-type epoxy resin (HP-7200H manufactured by Dainippon Ink & Chemicals, Inc.), a softening point is from 75° C. to 90° C., prepared as fine particles having a particle diameter of 100 μm or less by impact grinding.

Curing Agents (D)

Curing agent D-1: 3,3'-diaminodiphenylsulfone (ARADUR9719-1 manufactured by Huntsman Advanced Materials LLC)

Curing agent D-2: dicyandiamide (Epicure DICY 15 manufactured by Japan Epoxy Resins Co., Ltd.), latent curing agent Seven kinds of epoxy resin compositions (Examples 1 to 3, Comparative Examples 1 to 4) obtained as described above were each evaluated by a method described below in terms of tackiness and drapability of the prepreg, and porosity and peeling strength of the honeycomb panel. Measurement results are shown in Table 1.

[Tackiness and Drapability of Prepregs]

A resin film was formed on an exfoliate paper using each of the obtained epoxy resin compositions, and the film was transferred to a carbon fiber flat-woven fabric (T-300-3K manufactured by Toray Industries Co., Ltd.) by applying heat and pressure so as to achieve a resin content of 41 weight %. As a result, prepregs were obtained.

The prepregs thus obtained were evaluated by hand touching in terms of tackiness and drapability on a three-point scale described below.

Evaluation of tackiness of prepregs
Excellent: sufficient adhesiveness was sensed
Good: some adhesiveness was sensed
Poor: almost no adhesiveness was sensed
Evaluation of drapability of prepregs
Excellent: sufficient flexibility was sensed
Good: some flexibility was sensed
Poor: almost no flexibility was sensed

[Porosity of Honeycomb Panels]

Two sheets of prepregs made of the individual obtained epoxy resin compositions were laminated to each other, arranged on both sides of a honeycomb core (Nomex honeycomb SA-1/8-8.0 manufactured by Showa Aircraft Industry Co., Ltd.), placed in a bag, and heated in an autoclave at a temperature of 180° C. for 2 hours (temperature rise rate of 2.8° C./minute) for curing to prepare a honeycomb panel. During this process, the inside of the autoclave was pressurized to 0.32 MPa with compressed air.

Smoothness of the individual obtained honeycomb panel face sheets was visually examined, and evaluated on a three-point scale described below.

Excellent: smooth without no unevenness observed on the surface
Good: slight unevenness observed on the surface
Poor: unevenness observed on the surface

[Peeling Strength of Honeycomb Panels]

For the honeycomb panels obtained as described above, the face sheets arranged the upper and lower sides of the honeycomb core in the heat curing process were each processed to a predetermined size, and peeling strength (lb-in/3in) of test pieces of the upper-side face sheet and the lower-side face sheet at a temperature of 23° C. (dry condition) was measured according to ASTM D1781.

TABLE 1

|  |  |  | Example 1 | Example 2 | Example 3 | Comparative Example 1 | Comparative Example 2 | Comparative Example 3 | Comparative Example 4 |
|---|---|---|---|---|---|---|---|---|---|
| Epoxy resin | Resin A-1 | parts by weight | 70 | — | 50 | 70 | 70 | — | 70 |
|  | Resin A-2 | parts by weight | — | 70 | 30 | — | — | — | — |
|  | Resin A-3 | parts by weight | 30 | 30 | 20 | 30 | 30 | 40 | 30 |
|  | Resin A-4 | parts by weight | — | — | — | — | — | 60 | — |
| Thermoplastic resin | Resin B-1 (dissolved part) | parts by weight | 45 | 45 | 48 | 45 | 45 | 40 | 45 |
|  | Resin B-2 (undissolved part) | parts by weight | — | — | — | — | 15 | — | — |
| Thermosetting resin particles | Resin C-1 | parts by weight | 15 | 15 | 10 | — | — | 15 | — |
|  | Resin C-2 | parts by weight | — | — | — | — | — | — | 15 |
| Curing agent | Curing agent D-1 | parts by weight | 34 | 34 | 34 | 34 | 34 | 34 | 34 |
|  | Curing agent D-2 | parts by weight | 2 | 2 | 2 | 2 | 2 | 2 | 2 |
| Property evaluation results | Tackiness of prepreg |  | Excellent | Excellent | Excellent | Excellent | Poor | Poor | Good |
|  | Drapability of prepreg |  | Excellent | Excellent | Excellent | Excellent | Poor | Poor | Poor |
|  | Porosity of honeycomb panel |  | Excellent | Excellent | Excellent | Poor | Excellent | Poor | Poor |
|  | Peeling strength of upper face sheet lb-in/3 in |  | 28.0 | 26.8 | 29.4 | 19.8 | 30.9 | 23.2 | 21.5 |
|  | Peeling strength of lower face sheet lb-in/3 in |  | 27.8 | 27.2 | 28.5 | 18.5 | 28.7 | 24.1 | 20.8 |

According to the results shown in Table 1, Examples 1 to 3 of the present invention exhibited excellent properties both in tackiness and drapability of the prepreg and in porosity and peeling strength of the honeycomb panel. On the other hand, it was observed that Comparative Example 1 which contained no thermosetting resin particles (C) resulted in poor porosity and peeling strength of the honeycomb panel, and that Comparative Example 2 which contained a part of the thermoplastic resin (B) in an undissolved state replacing the thermosetting resin particles (C) resulted in poor tackiness and drapability of the prepreg.

What is claimed is:

1. An epoxy resin composition for fiber-reinforced composite materials, comprising:
    an epoxy resin (A) that is in a liquid state at room temperature;
    a thermoplastic resin (B) that dissolves in the epoxy resin (A) at a temperature not less than 90° C.;
    thermosetting resin particles (C) that do not completely dissolve in the epoxy resin (A) at a temperature less than 90° C., but completely dissolve in the epoxy resin (A) upon heating of the composition and have a softening point of not less than 120° C.; and
    a curing agent (D), wherein the thermosetting resin particles (C) are made of an epoxy-based resin comprising bisphenol A-type epoxy resin that is in a solid state at room temperature, and wherein the epoxy resin composition contains, with respect to 100 parts by weight of the epoxy resin (A), 30 to 50 parts by weight of the thermoplastic resin (B) and 2 to 20 parts by weight of the thermosetting resin particles (C).

2. The epoxy resin composition for fiber-reinforced composite materials according to claim 1, wherein
    the thermoplastic resin (B) is both or any one of a polyethersulfone resin particle and a polyetherimide resin particle, and
    the particle diameter thereof is 200 μm or less.

3. The epoxy resin composition for fiber-reinforced composite materials according to claim 1, wherein the thermosetting resin particles (C) has a particle diameter of 100 μm or less.

4. The epoxy resin composition for fiber-reinforced composite materials according to claim 1, wherein the curing agent (D) is both or any one of 3,3'-diaminodiphenylsulfone and 4,4'-diaminodiphenylsulfone.

5. The epoxy resin composition for fiber-reinforced composite materials according to claim 1, wherein the curing agent (D) is used in combination with a latent curing agent.

6. The epoxy resin composition for fiber-reinforced composite materials according to claim 1, wherein the epoxy resin composition has a minimum viscosity of from 10 to 150 Pa·s measured in dynamic viscoelasticity measurement at a temperature rise rate of 2° C./minute.

7. The epoxy resin composition for fiber-reinforced composite materials according to claim 1, wherein a fracture toughness value measured according to ASTM D5045-91 after curing of the epoxy resin composition is 1.8 MPa·$\sqrt{m}$ or larger.

8. A method for producing the epoxy resin composition for fiber-reinforced composite materials according to claim 1, comprising:
    dissolving the thermoplastic resin (B) in the epoxy resin (A) at a temperature of from 95 to 150° C. followed by cooling to a temperature of from 60 to 90° C.; and,
    thereafter, adding thereto the thermosetting resin particles (C) and the curing agent (D).

9. A fiber-reinforced prepreg, comprising the epoxy resin composition according to claim 1 as a matrix resin in complex with a reinforcing fiber.

10. The fiber-reinforced prepreg according to claim 9, wherein a content of the matrix resin is from 30 to 50 weight %.

11. The fiber-reinforced prepreg according to claim 9, wherein the reinforcing fiber is carbon fiber.

12. A honeycomb sandwich panel, comprising the fiber-reinforced prepreg according to claim 1 and a honeycomb core that are laminated to each other.

13. The honeycomb sandwich panel according to claim 12, wherein the honeycomb core is any one selected from the group consisting of aramid honeycombs, aluminum honeycombs, paper honeycombs, and glass honeycombs.

14. The epoxy resin composition for fiber-reinforced composite materials according to claim 2, wherein the thermosetting resin particles (C) has a particle diameter of 100 μm or less.

15. The epoxy resin composition for fiber-reinforced composite materials according to claim 2, wherein the curing agent (D) is both or any one of 3,3'-diaminodiphenylsulfone and 4,4'-diaminodiphenylsulfone.

16. The epoxy resin composition for fiber-reinforced composite materials according to claim 3, wherein the curing agent (D) is both or any one of 3,3'-diaminodiphenylsulfone and 4,4'-diaminodiphenylsulfone.

* * * * *